(12) United States Patent
Kim et al.

(10) Patent No.: US 8,964,135 B2
(45) Date of Patent: Feb. 24, 2015

(54) STEREOSCOPIC DISPLAY DEVICE

(75) Inventors: Sung Woo Kim, Gyeonggi-do (KR); Jong Hoon Woo, Gyeonggi-do (KR); Hee Jin Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 219 days.

(21) Appl. No.: 12/956,101

(22) Filed: Nov. 30, 2010

(65) Prior Publication Data

US 2011/0157495 A1 Jun. 30, 2011

(30) Foreign Application Priority Data

Dec. 31, 2009 (KR) .................. 10-2009-0135691

(51) Int. Cl.
*G02F 1/1335* (2006.01)
*G02B 27/22* (2006.01)
(52) U.S. Cl.
CPC ................... *G02B 27/2214* (2013.01)
USPC .......................................................... 349/15
(58) Field of Classification Search
CPC .................... G02B 27/2214; H04N 13/0409
USPC .......................................................... 349/15
See application file for complete search history.

(56) References Cited

U.S. PATENT DOCUMENTS

| | | | |
|---|---|---|---|
| 2006/0082519 A1* | 4/2006 | Nam et al. | 345/9 |
| 2007/0115230 A1* | 5/2007 | Tajiri et al. | 345/87 |
| 2007/0195410 A1* | 8/2007 | Yun et al. | 359/464 |
| 2008/0278640 A1* | 11/2008 | Ijzerman et al. | 349/15 |
| 2009/0102990 A1* | 4/2009 | Walton et al. | 349/15 |
| 2010/0110316 A1* | 5/2010 | Huang et al. | 349/15 |

FOREIGN PATENT DOCUMENTS

CN 101604091 12/2009

OTHER PUBLICATIONS

Office Action issued in a counterpart Chinese Patent Application No. 201010271303.9 dated Nov. 5, 2012.

* cited by examiner

*Primary Examiner* — Jessica M Merlin
(74) *Attorney, Agent, or Firm* — Morgan, Lewis & Bockius LLP

(57) ABSTRACT

Disclosed is stereoscopic display device in which barriers crossing each other are formed on two substrates and voltage is applied to the barrier pattern to drive liquid crystals between the two substrates such that one of the barriers is selectively driven, enabling selective implementation of 3-dimensional (3D) display and dual view display.

8 Claims, 7 Drawing Sheets

STEREOSCOPIC DISPLAY DEVICE

This application claims the benefit of the Korean Patent Application No. 10-2009-0135691, filed on Dec. 31, 2009, which is hereby incorporated by reference as if fully set forth herein.

BACKGROUND OF THE INVENTION

1. Field of the Invention

The present invention relates to an electrically-driven liquid crystal lens, and more particularly, to a stereoscopic display device in which barriers crossing each other are formed on two substrates and voltage is applied to the barrier pattern to drive liquid crystals between the two substrates such that one of the barriers is selectively driven, enabling selective implementation of 3-dimensional (3D) display and dual view display.

2. Discussion of the Related Art

At present, services for rapid dissemination of information, to be constructed based on high-speed information communication networks, have developed from a simple "listening and speaking" service, such as current telephones, to a "watching and listening" multimedia type service based on digital terminals used for high-speed processing of characters, voices and images, and are expected to be ultimately developed into hyperspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference between the two eyes. Such an image difference due to the positional difference between the two eyes is called binocular disparity. A 3-dimensional stereoscopic image display device is designed based on binocular disparity, allowing the left eye to view only an image for the left eye and the right eye to view only an image for the right eye.

Specifically, the left and right eyes view different 2-dimensional images, respectively. If the two different images are transmitted to the brain through the retina, the brain accurately combines the images, reproducing depth perception and realism of an original 3-dimensional (3D) image. This ability is conventionally referred to as stereography (stereoscopy), and a display device to which stereoscopy is applied is referred to as a stereoscopic display device.

In the meantime, stereoscopic display devices may be classified based on constituent elements of a lens which realizes 3-dimensional images. In one example, a lens using a liquid crystal layer is referred to as an electrically-driven liquid crystal lens.

Generally, a liquid crystal display device includes two electrodes opposite each other, and a liquid crystal layer interposed between the two electrodes. Liquid crystal molecules of the liquid crystal layer are driven by an electric field created when voltages are applied to the two electrodes. The liquid crystal molecules have polarization and optical anisotropy characteristics. Here, polarization refers to a change in molecular arrangement direction according an electric field, which is caused as electrons in liquid crystal molecules are gathered to opposite sides of the liquid crystal molecules when the liquid crystal molecules are under the influence of an electric field. Also, optical anisotropy refers to a change in path or polarization of light to be emitted according to an incidence direction or polarization of incident light, which is caused by an elongated shape of liquid crystal molecules and the above-mentioned molecular arrangement direction.

Accordingly, the liquid crystal layer has a transmittance difference due to voltages applied to the two electrodes, and is able to display an image by varying the transmittance difference on a per pixel basis.

Recently, there has been proposed an electrically-driven liquid crystal lens in which a liquid crystal layer serves as a lens based on the above-described characteristics of liquid crystal molecules.

Specifically, a lens is designed to control a path of incident light on a per position basis using a difference between a refractive index of a lens constituent material and a refractive index of air. In the electrically-driven liquid crystal lens, if different voltages are applied to electrodes located at different positions of the liquid crystal layer so as to create an electric field required to drive the liquid crystal layer, incident light introduced into the liquid crystal layer undergoes different phase variations on a per position basis, and as a result, the liquid crystal layer is able to control the path of the incident light in the same manner as an actual lens.

Hereinafter, an electrically-driven liquid crystal lens of related art will be described with reference to the accompanying drawings.

FIG. 1 is a sectional view illustrating an electrically-driven liquid crystal lens of related art, and FIG. 2 is a schematic view illustrating a potential distribution of the electrically-driven liquid crystal lens of FIG. 1 after voltage is applied to the electrically-driven liquid crystal lens.

As illustrated in FIG. 1, the electrically-driven liquid crystal lens of the related art includes first and second substrates 10 and 20 opposite each other, and a liquid crystal layer 30 formed between the first substrate 10 and the second substrate 20.

First electrodes 11 are arranged on the first substrate 10 and are spaced apart from one another by a first distance. In the two neighboring first electrodes 11, a distance from the center of one first electrode 11 to the center of the other first electrode 11 is referred to as a "pitch". Repeating the same pitch for the respective first electrodes results in a pattern.

A second electrode 21 is formed over the entire surface of the second substrate 20 opposite the first substrate 10.

The first and second electrodes 11 and 21 are made of transparent metal. The liquid crystal layer 30 is formed in a space between the first electrodes 11 and the second electrode 21. Liquid crystal molecules of the liquid crystal layer 30 have a parabolic potential surface due to a property reacting according to the intensity and distribution of an electric field and thus, have a phase distribution similar to that of the electrically-driven liquid crystal lens as illustrated in FIG. 2.

The above-described electrically-driven liquid crystal lens is realized under the condition that high voltages are applied to the first electrode 11 and the second electrode 21 is grounded. With this voltage condition, a vertical electric field is strongest at the center of the first electrode 11, and the intensity of the vertical electric field decreases away from the first electrode 11. Accordingly, if the liquid crystal molecules of the liquid crystal layer 30 have positive dielectric constant anisotropy, the liquid crystal molecules are arranged according to the electric field in such a way that the liquid crystal molecules are upright at the center of the first electrode 11 and are gradually tilted approximately horizontally away from the first electrode 11. As a result, in view of light transmission, an optical path is shortened at the center of the first electrode 11, and is lengthened with increasing distance from the first electrode 11, as illustrated in FIG. 2. Representing the length variation of the optical path using a phase plane, the electrically-driven liquid crystal lens has light transmission effects similar to a lens having a parabolic surface.

Here, the second electrode 21 causes behavior of the electric field created by the liquid crystal molecules, making a refractive index of light spatially take the form of a parabolic function. The first electrode 11 corresponds to an edge of a unit lens region.

In this case, relatively high voltages are applied to the first electrodes 11 than the second electrode 21. Therefore, as illustrated in FIG. 2, an electric potential difference occurs between the first electrodes 11 and the second electrode 21. In particular, a steep lateral electric field is created around the first electrodes 11. Accordingly, liquid crystals have a slightly distorted distribution rather than a gentle distribution, whereby a refractive index of light cannot exhibit parabolic spatial distribution, or movement of the liquid crystals is excessively sensitive to voltage variation.

The above-described electrically-driven liquid crystal lens of the related art may be realized, without a lens having a parabolic surface, by arranging electrodes on two substrates with liquid crystals interposed therebetween and applying voltages to the electrodes.

The above described electrically-driven liquid crystal lens has the following problems.

Firstly, since the electrodes formed on the lower substrate are positioned at only a part of a lens region, a steep lateral electric field, rather than a gentle electric field, is created between a lens edge region corresponding to the electrode and a lens center region distant from the lens edge region, resulting in a slightly distorted phase of the electrically-driven liquid crystal lens. In particular, in the electrically-driven liquid crystal lens that is driven by a liquid crystal field, since the greater the pitch of lens regions, the smaller the number of electrodes to which high voltages are applied, an insufficient electric field is created between the high voltage electrodes and a substrate opposite these electrodes. Accordingly, it becomes difficult to form the electrically-driven liquid crystal lens having a gentle parabolic lens surface, which has the same effects as an actual lens.

Secondly, the above described liquid crystal lens of the related art realizes only uni-directional 3D display, and is unsuitable to realize various kinds of display.

In particular, like recent dual view display, there is a need for a display device that allows viewers located at different positions to perceive different images, and thus, a research thereinto is being performed.

In the meantime, although a stereoscopic display device of related art using barriers may display a 3-dimensional (3D) image, there is a risk in that the viewer perceives incorrect images or colors if the viewer slightly deviates from a binocular disparity range or a viewing angle is reduced.

SUMMARY OF THE INVENTION

Accordingly, the present invention is directed to a stereoscopic display device that substantially obviates one or more problems due to limitations and disadvantages of the related art.

An object of the present invention is to provide a stereoscopic display device in which barriers crossing each other are formed on two substrates and voltage is applied to the barrier pattern to drive liquid crystals between the two substrates such that one of the barriers is selectively driven, enabling selective implementation of 3-dimensional (3D) display and dual view display.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic display device includes a display panel, and a barrier cell provided above the display panel and including first and second substrates opposite each other, first and second barriers formed respectively on the first and second substrates in directions crossing each other and a liquid crystal layer between the first and second substrates, the first and second barriers selectively functioning according to voltage application such that 3-dimensional (3D) display is implemented during functioning of the first barrier and dual view display is implemented during functioning of the second barrier to allow viewers located at different positions to perceive different images.

The first barrier may be formed on the first substrate in a first direction and may include a plurality of first electrodes which are equidistantly arranged and have the same width, and the second barrier may be formed on the second substrate in a second direction crossing the first direction, and may include a plurality of second electrodes which are equidistantly arranged and have the same width.

The barrier cell may emit an image of the display panel when no voltage is applied to the first electrodes and the second electrodes.

A common voltage may be applied to the second electrodes and a drive voltage greater than the common voltage may be applied to the first electrodes during functioning of the first barrier.

A common voltage may be applied to the first electrodes and a drive voltage greater than the common voltage may be applied to the second electrodes during functioning of the second barrier.

A rear distance between the display panel and the barrier cell may be constant during functioning of the first barrier and functioning of the first barrier.

Two viewers may be spaced apart from each other by a predetermined distance at the same viewing distance when dual view display is implemented during functioning of the second barrier. The viewing distance during functioning of the second barrier may be longer than a viewing distance during functioning of the first barrier.

The first and second electrodes may be made of transparent electrodes.

The first electrodes and the second electrodes may have different widths and distances.

The barrier cell has a normally white mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to a stereoscopic display device according to the preferred embodiments of the present invention, examples of which are illustrated in the accompanying drawings. Wherever possible, the same reference numbers will be used throughout the drawings to refer to the same or like parts.

Figure 1:
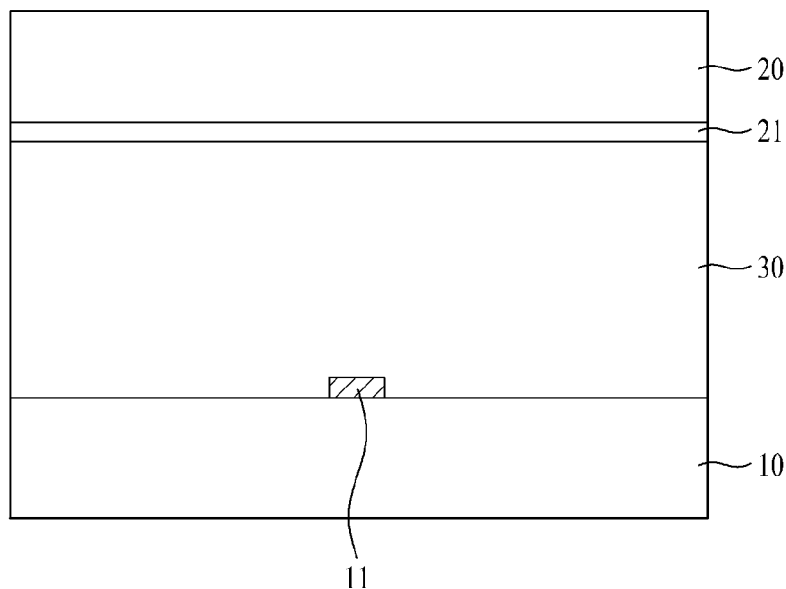
FIG. 1 is a sectional view illustrating an electrically-driven liquid crystal lens of related art for use in a stereoscopic display device.
Figure 2:
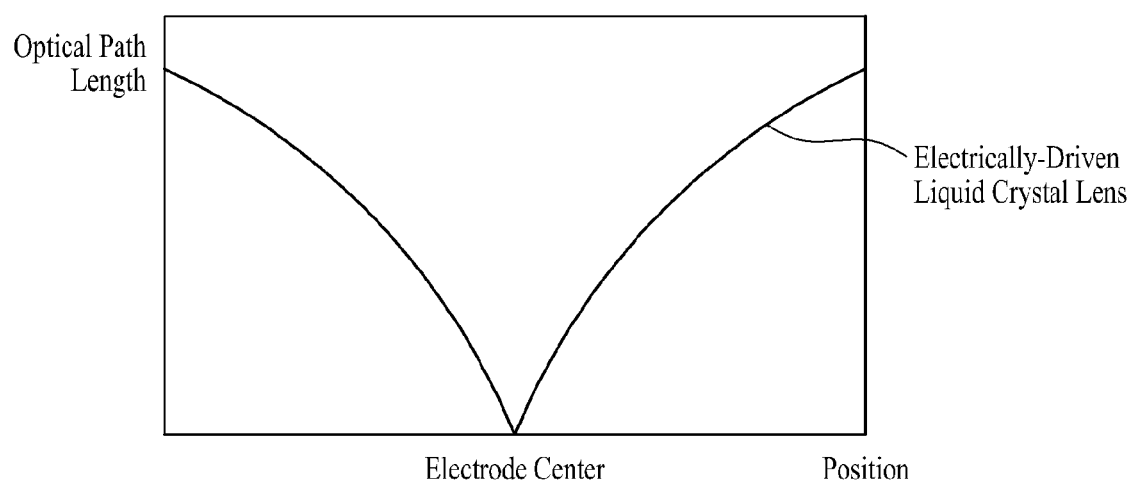
FIG. 2 is a view illustrating a potential distribution after voltage is applied to the electrically-driven liquid crystal lens of FIG. 1.
Figure 3:
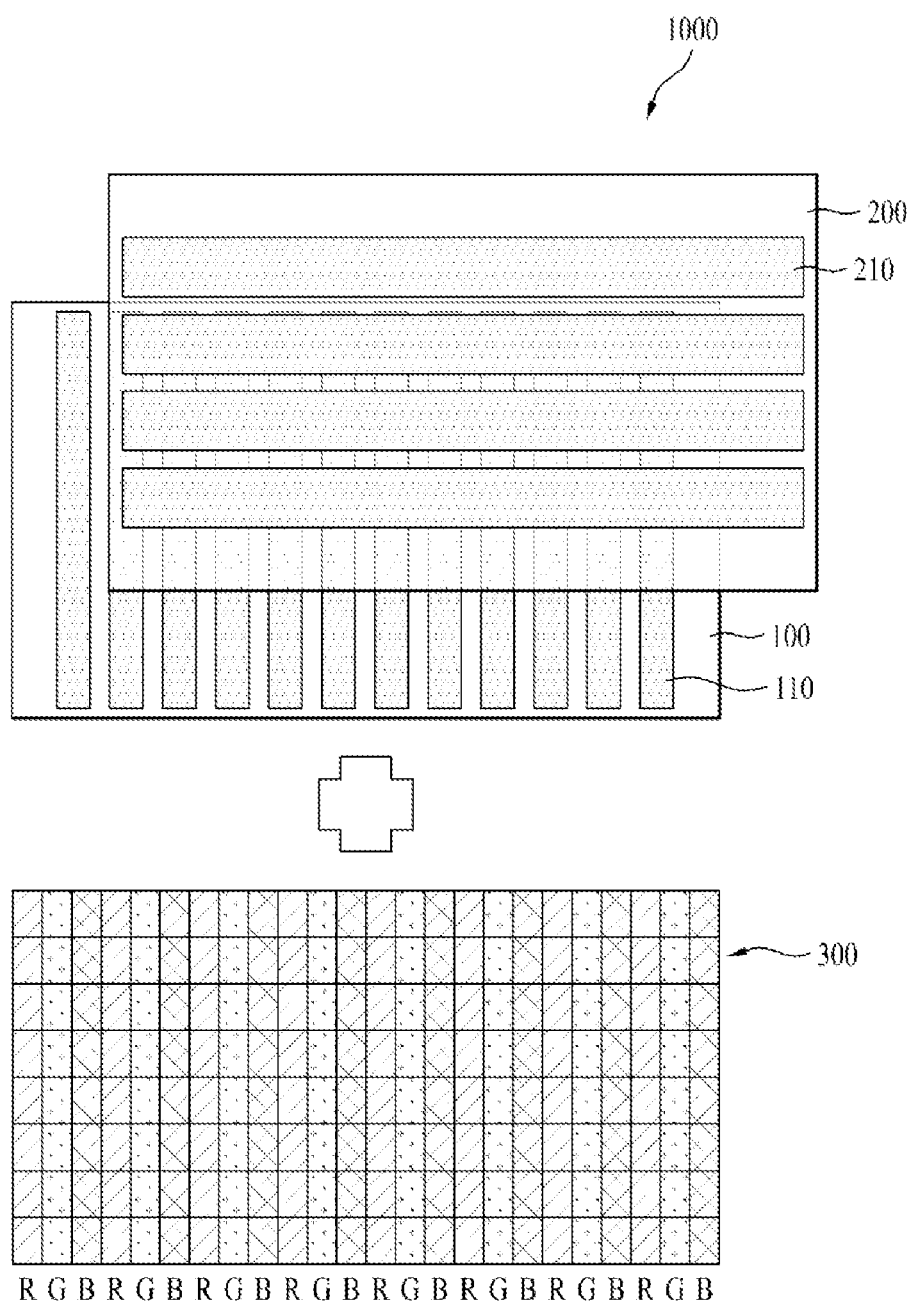
FIG. 3 is an exploded view of a stereoscopic display device according to the present invention.
Figure 4:
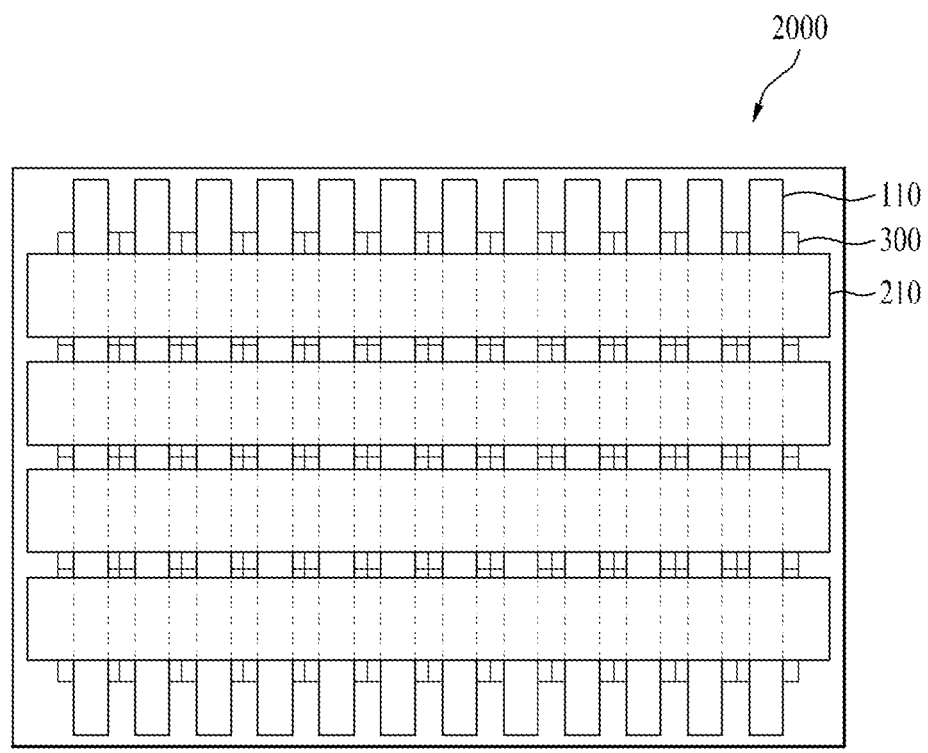
FIG. 4 is a plan view illustrating a completely bonded state of the stereoscopic display device according to the present invention.

FIG. 3 is an exploded view of a stereoscopic display device according to the present invention, and FIG. 4 is a plan view illustrating a bonded state of the stereoscopic display device according to the present invention.

As illustrated in FIGS. 3 and 4, the stereoscopic display device 200 of the present invention includes a display panel 300 which includes Red, Green and Blue sub pixels to enable display of a color image, and a barrier cell 1000. The barrier cell 1000 includes first and second substrates 100 and 200 opposite each other, first and second barriers formed respectively on the first and second substrates 100 and 200 in directions crossing each other, and a liquid crystal layer (not shown) between the first and second substrates 100 and 200. When voltage is applied to the barrier cell 1000, the first barrier and the second barrier selectively function, such that 3-dimensional (3D) display is implemented during functioning of the first barrier and dual view display is implemented during functioning of the second barrier. Here, the term "dual view display" means that viewers located at different positions perceive different images.

The display panel 300 may be selected from various flat-panel displays including a Liquid Crystal Display (LCD), Organic Light Emitting Display (OLED), Plasma Display Panel (PDP), Field Emission Display (FED), etc. Assuming that the display panel 300 is, for example, a liquid crystal panel, the display panel 300 may include first and second substrates opposite each other, a liquid crystal layer filled between the first and second substrates, a thin film transistor array formed on the first substrate, and a color filter array formed on the second substrate.

Although the above described embodiment illustrates the case of locating the barrier cell 1000 on the display panel 300, the barrier cell 1000 may be located beneath the display panel 300.

The first barrier is formed on the first substrate 100 in a first direction, and includes a plurality of first electrodes 110 which are equidistantly arranged and have the same width. The second barrier is formed on the second substrate 200 in a second direction crossing the first direction, and includes a plurality of second electrodes 210 which are equidistantly arranged and have the same width.

The first barrier is a light shade pattern, which is switched on when voltage is applied to the first electrodes 110, thereby being operated in a longitudinal direction of the first electrodes 110. More particularly, as voltage is applied to the first electrodes 110, the liquid crystal layer between the first and second substrates 100 and 200 is operated such that liquid crystals of the barrier cell 1000, which are originally normally white, are aligned in a given direction. In this case, liquid crystals corresponding to the first electrodes 110 are aligned in a first alignment direction to intercept transmission of light.

Similarly, the second barrier is a light shade pattern, which is switched on when voltage is applied to the second electrodes 210, thereby being operated in a longitudinal direction of the second electrodes 210. Liquid crystals are aligned in a second alignment direction crossing the first alignment direction to allow transmission of light only between the second electrodes 210.

On the other hand, when no voltage is applied to the first electrodes 110 and the second electrodes 210, the barrier cell 1000 directly emits an image of the display panel 300. Specifically, to achieve emission of an image when no voltage is applied, the first and second electrodes 110 and 210 are formed into transparent electrodes.

The width and distance of the first and second electrodes 110 and 210 are set in consideration of, e.g., the number of views of a 3-dimensional (3D) image to be formed and an image viewing distance for dual view display.

Figure 5:
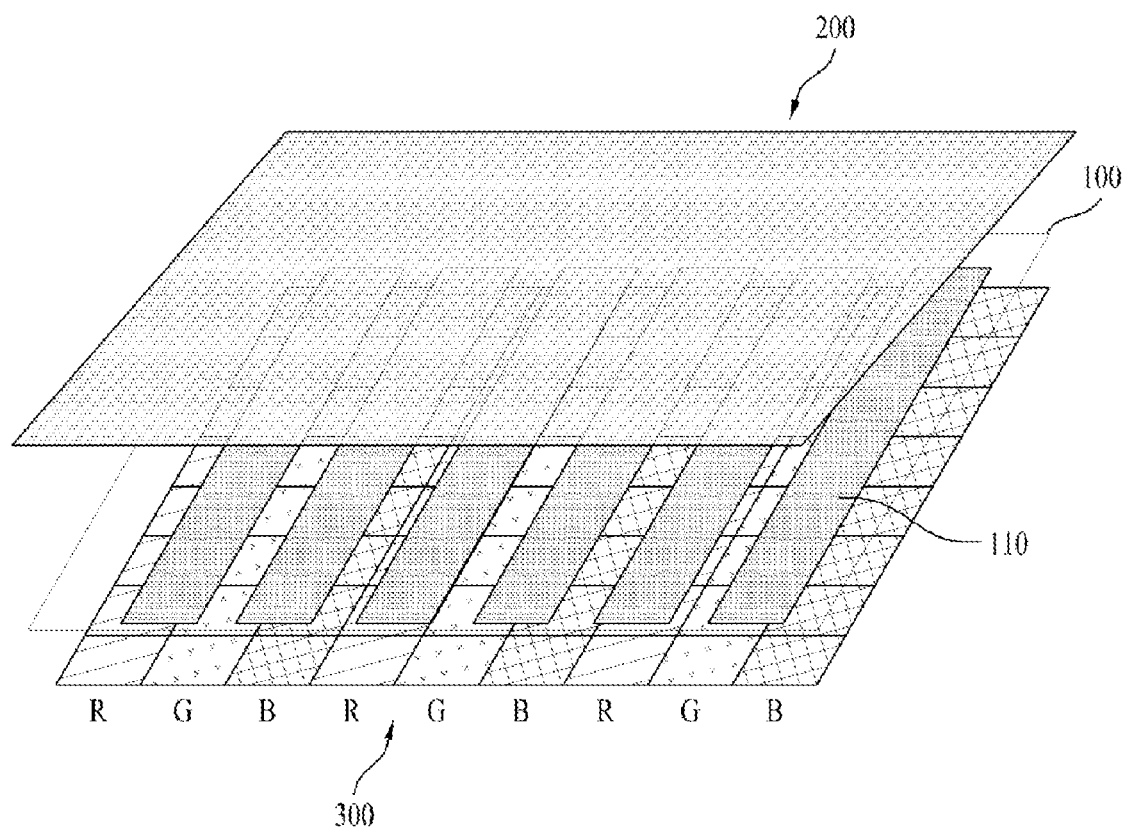
FIG. 5 is a view illustrating 3-dimensional (3D) display using the stereoscopic display device according to the present invention.
Figure 6:
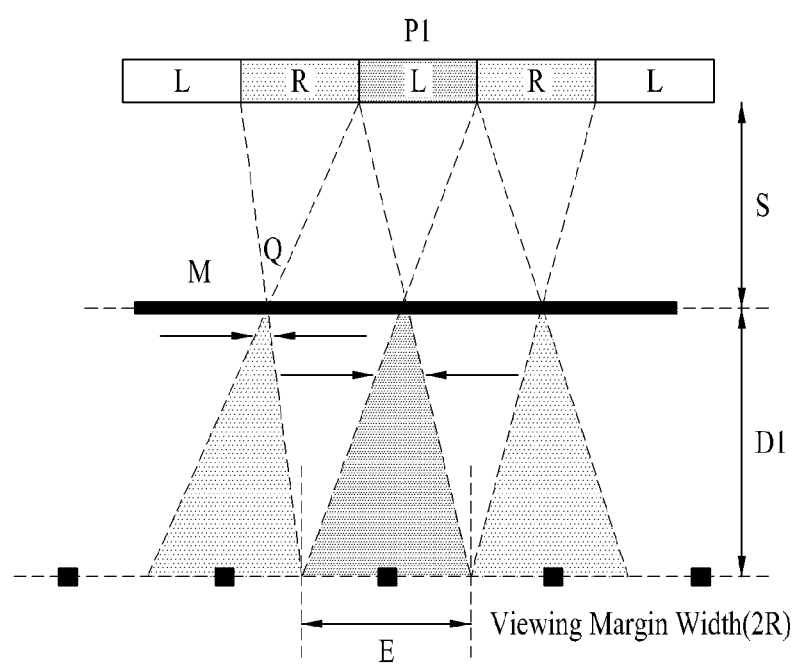
FIG. 6 is a view illustrating the viewing principle of FIG. 5.

FIG. 5 is a view illustrating 3-dimensional (3D) display using the stereoscopic display device according to the present invention, and FIG. 6 is a view illustrating the viewing principle of FIG. 5.

As illustrated in FIGS. 5 and 6, during functioning of the first barrier, a common voltage Vcom is applied to the second electrodes 210, and a first voltage V1 greater than the common voltage is applied to the first electrodes 110.

Here, the common voltage is a constant level of phase voltage that is equal to 0V or less than 2V, and the first voltage V1 has a value greater than the common voltage Vcom, to create a vertical electric field between the first and second electrodes.

To implement 3D display (stereoscopic display), spaces between the first electrodes 110 serve as slits in a range of binocular disparity (65 mm). Thus, as the viewer perceives images for the left and right eyes individually through the spaces between the first electrodes 110, visual perception of 3D display can be accomplished.

In this case, 3D display has a requirement of D1=S*E/P1 (here, E is a binocular disparity and has a constant value of 65 mm, S is a rear distance (i.e. a distance between the barrier cell and the display panel) and has a constant value, P1 is a pitch of the first electrodes of the barrier cell and is a variable, and D1 is a viewer's viewing distance in the case of 3D display and is a variable.

Figure 7:
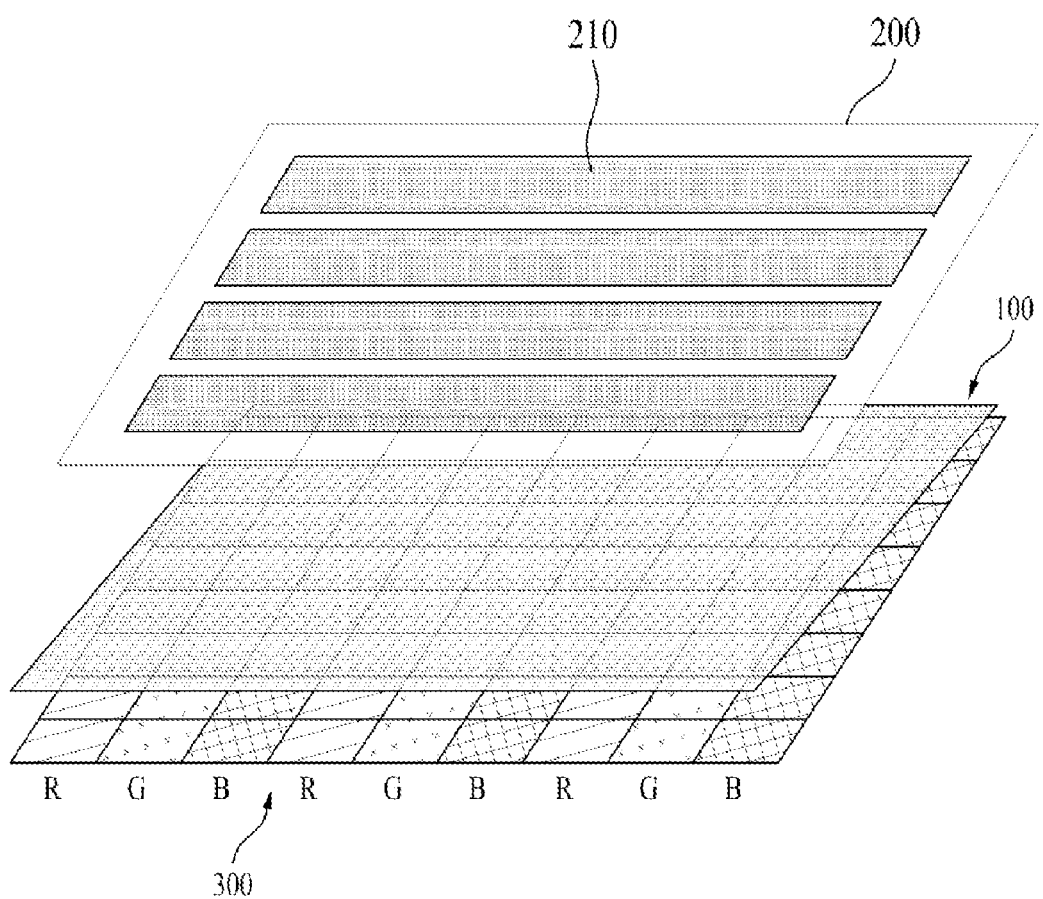
FIG. 7 is a view illustrating dual view display using the stereoscopic display device according to the present invention.
Figure 8:
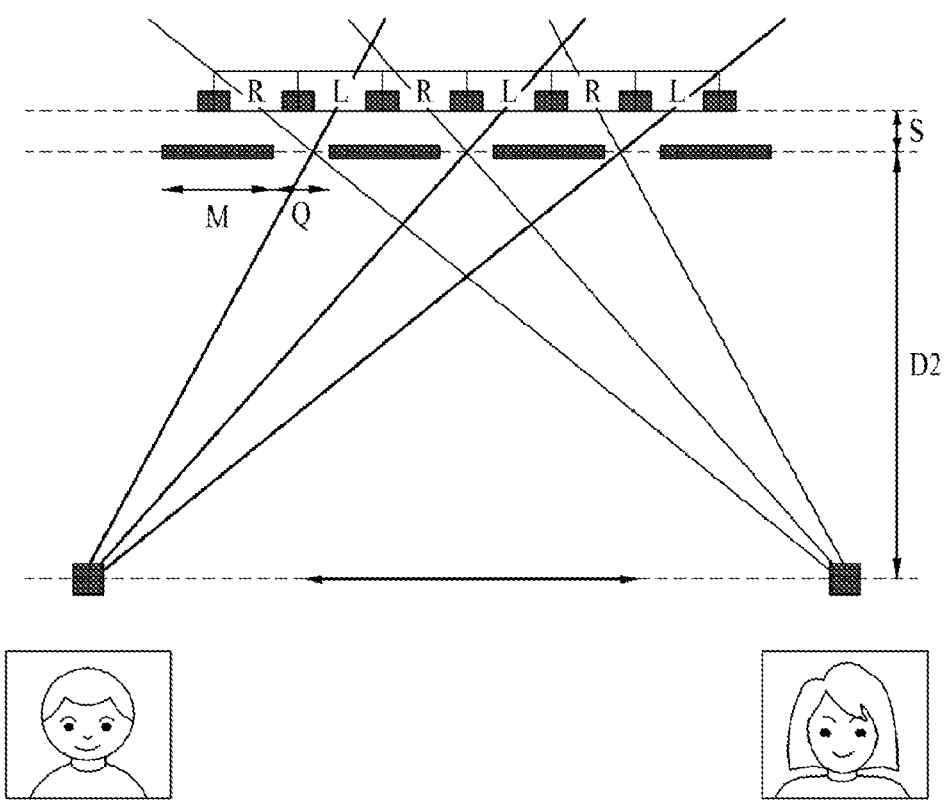
FIG. 8 is a view illustrating the viewing principle of FIG. 7.

FIG. 7 is a view illustrating dual view display using the stereoscopic display device according to the present invention, and FIG. 8 is a view illustrating the viewing principle of FIG. 7.

As illustrated in FIGS. 7 and 8, during functioning of the second barrier, the common voltage Vcom is applied to the first electrodes 110, and a second voltage V2 greater than the common voltage is applied to the second electrodes 210.

Dual view display allows viewers, who are spaced apart from each other by a predetermined distance and have the same viewing distance, to perceive different images. This is possible because the viewers located at different positions look different display regions emitting different images.

As compared to FIGS. 5 and 6, the viewers are located at a relatively remote viewing distance. In this case, the rear distance S is constant in both 3D display and dual view display.

The dual view display has a requirement of D2=S*E2/P2 (here, E2 is a distance between viewers, and P2 is a pitch of the second electrodes).

In the above described stereoscopic display device of the present invention, the single barrier cell 1000 is able to implement both 3D display and dual view display under the assumption that the rear distance S is constant.

A designer may change the above mentioned values D1, D2, E2, P1 and P2 according to requirements.

For example, if the distance between viewers E2 is 650 mm 10 times binocular disparity, the pitch P2 between the second electrodes may be set to 10 times the pitch P1 between the first electrodes.

In another example, if the pitch P1 between the first electrodes and the pitch P2 between the second electrodes are equal and the distance between viewers E2 is 650 mm, the viewing distance D2 for dual view display may be 10 times the viewing distance D1 for 3D display.

As described above, the viewer's viewing distance D1 in the case of 3D display, and the distance between viewers E2 and the viewer's viewing distance D2 in the case of dual view display, the pitch P1 between the first electrodes and the pitch P2 between the second electrodes may be changed according to a corresponding application. In any case, the rear distance S is constant.

For convenience of description, it is preferable that a viewing distance during functioning of the second barrier be longer than a viewing distance during functioning of the first barrier.

Here, the rear distance S is a fixed value obtained when the barrier cell 1000 and the display panel 300 are bonded to each other, whereas a barrier pitch and slit width depending on the width and distance of the first and second electrodes are variables values.

Accordingly, the single barrier cell 1000 can implement 3D display and dual view display according to voltage application as the variables P and E (here, E is binocular disparity/distance between viewers).

Tables 1 and 2 represent a pixel pitch (display panel), binocular disparity, left and right viewing margins, viewing distance, rear distance, barrier width (electrode width) and slit width (distance between electrodes) of actual 15" and 47" models required for 3D display and dual view display. It can be confirmed from Tables 1 and 2 that these models have the same rear distance in the cases of 3D display and dual view display.

Here, the viewing distances of the 15" and 47" models are determined suitably for a monitor and a large-size television respectively, and are selected to provide the viewer with the most comfortable viewing environment possible.

TABLE 1

| 15" | 3D display | Dual View display |
|---|---|---|
| Pixel Pitch (P) | 99 μm | 297 μm |
| Binocular Disparity/Distance between Viewers (E) | 6.5 cm | 65 cm |

TABLE 1-continued

| 15" | 3D display | Dual View display |
|---|---|---|
| Left and Right Viewing Margins (2R) | 6 cm | 60 cm |
| Viewing Distance (D) | 38.3 cm | 128 cm |
| Rear Distance (S) | 583.3 μm | 583.3 μm |
| Barrier Width (M) | 166.1 μm | 530.9 μm |
| Slit Width (Q) | 31.5 μm | 62.8 μm |

TABLE 2

| 47" | 3D | Dual View |
|---|---|---|
| Pixel Pitch (P) | 180.5 μm | 541.5 μm |
| Binocular Disparity/Distance between Viewers (E) | 6.5 cm | 65 cm |
| Left and Right Viewing Margins (2R) | 6 cm | 60 cm |
| Viewing Distance (D) | 150 cm | 500 cm |
| Rear Distance (S) | 4165.3 μm | 4165.3 μm |
| Barrier Width (M) | 306.0 μm | 973.7 μm |
| Slit Width (Q) | 53.9 μm | 108.8 μm |

As apparent from the above description, a stereoscopic display device of the present invention has the following effects.

First and second barriers, which are provided in a barrier cell in directions crossing each other, are selectively switched on according to voltage application, such that 3D display is implemented during functioning of the first barrier and dual view display, which allows viewers who are spaced apart from each other by a predetermined distance at the same viewing distance to perceive different images, is implemented during functioning of the second barrier under the condition of the same rear distance.

In this case, the single barrier cell can implement 3D display and dual view display via a switching function thereof without requiring an additional panel, thus being capable of satisfying demands for various displays without cost increase.

That is, although a stereoscopic display device of related art using barriers may display a 3-dimensional (3D) image, there is a risk in that the viewer perceives incorrect images or colors if the viewer slightly deviates from a binocular disparity range or a viewing angle is reduced. However, in the present invention, the barriers are formed on a per pixel basis to enable simultaneous perception of Red, Green and Blue images. In addition, 3D display may be implemented within a binocular disparity range, and after switching, dual view display may be implemented to allow viewers spaced apart from each other by a predetermined distance to perceive an image for the left eye and an image for the right eye respectively.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic display device, comprising:
a display panel including a plurality of red, green, and blue pixels; and
a barrier cell provided above the display panel and including first and second substrates opposite each other, a plurality of first electrodes formed on the first substrate in a first direction, a plurality of second electrodes formed on the second substrate in a second direction crossing the first direction, and a liquid crystal layer between the first and second substrates, wherein the barrier cell functions as a first barrier or a second barrier according to voltage application such that 3-dimensional (3D) display is implemented during functioning of the barrier cell as the first barrier and dual view display is implemented during functioning of the barrier cell as the second barrier to allow viewers located at different positions to perceive different images, wherein a common voltage is applied to the second electrodes and one first drive voltage greater than the common voltage is applied to the first electrodes during functioning of the barrier cell as the first barrier, wherein a common voltage is applied to the first electrodes and one second drive voltage greater than the common voltage is applied to the second electrodes during functioning of the barrier cell as the second barrier, wherein the first electrodes or the second electrodes function as light shade patterns during voltages are applied to the barrier cell, wherein the first electrodes are equidistantly arranged and have the same width and the second electrodes are equidistantly arranged and have the same width, wherein the first electrodes are structured on a per-pixel basis, each of the first electrodes overlapping pixels that are two of the three colors of red, green, and blue, and pixels that are two of the three colors of red, green, and blue are exposed by each of a plurality of slits formed between the first electrodes, and wherein the first electrodes and the second electrodes have different widths and distances from each other so that the first barrier and the second barrier have different viewer's viewing distances.

2. The device according to claim 1, wherein the barrier cell emits an image of the display panel when no voltage is applied to the first electrodes and the second electrodes.

3. The device according to claim 1, wherein a rear distance between the display panel and the barrier cell is constant during functioning of the first barrier and functioning of the second barrier.

4. The device according to claim 1, wherein two viewers are spaced apart from each other by a predetermined distance at the same viewing distance when dual view display is implemented during functioning of the second barrier.

5. The device according to claim 4, wherein the viewing distance during functioning of the second barrier is longer than a viewing distance during functioning of the first barrier.

6. The device according to claim 1, wherein the first and second electrodes are made of transparent electrodes.

7. The device according to claim 1, wherein $D1=S*E/P1$ (E is a binocular disparity, S is a rear distance, P1 is the distance between first electrodes of the barrier, and D1 is a viewer's viewing distance) when implementing the 3D display, and $D2=S*E2/P2$ (E2 is a distance between viewers, and P2 is the distance between the second electrodes, and D2 is a viewer's viewing distance) when implementing the dual view display.

8. The device according to claim 1, wherein the second electrodes are wider than the first electrodes and wherein each of the second electrodes extends across an entire longitudinal direction of the display panel.

* * * * *